United States Patent [19]

Fujisawa et al.

[11] Patent Number: 5,283,664
[45] Date of Patent: Feb. 1, 1994

[54] APPARATUS FOR CONVERTING AND PROCESSING INPUT BI-LEVEL IMAGE DATA AND FAITHFULLY RENDERING TONES, COLORS, AND EDGES

[75] Inventors: Tetsuo Fujisawa, Urawa; Yukio Sakano, Tokyo; Toshiya Hikita, Sagamihara, all of Japan

[73] Assignee: Ricoh Company, Ltd., Tokyo, Japan

[21] Appl. No.: 773,728

[22] Filed: Oct. 9, 1991

[30] Foreign Application Priority Data

| Oct. 11, 1990 | [JP] | Japan | 2-272860 |
| Oct. 11, 1990 | [JP] | Japan | 2-272861 |
| Apr. 24, 1991 | [JP] | Japan | 3-94083 |

[51] Int. Cl.⁵ ............................................. G06K 9/00
[52] U.S. Cl. ....................................................... 358/429
[58] Field of Search ............................ 358/429–430, 358/426, 261.1–261.3, 262.1, 456–458, 461

[56] References Cited

U.S. PATENT DOCUMENTS

| 4,369,463 | 1/1983 | Anastassiou et al. | 358/430 |
| 4,558,370 | 12/1985 | Mitchell et al. | 358/429 |
| 5,014,134 | 5/1991 | Lawton et al. | 358/262.1 |
| 5,050,230 | 9/1991 | Jones et al. | 358/262.1 |

Primary Examiner—Stephen Brinich
Attorney, Agent, or Firm—Allen S. Melser

[57] ABSTRACT

An image recorder for converting input bilevel image data to multilevel data, executing various kinds of image processing with the mutlilevel data, and then recording the processed multilevel data. The image recorder converts input bilevel image data to M-level data (M being equal to or greater than 2), then requantized to N-level data, and then fed to a printer capable of recording data in three or more levels. The bilevel-to-multilevel conversion is effected in matching relation to the pattern of the input bilevel data. A plurality of bilevel-to-multilevel conversion means of different kinds are provided. The bilevel-to-multilevel conversion system is changed on the basis of the kind of input bilevel data. The M-level data is subjected to edge enhancement, magnification change, and gamma correction. Color image data produced by color separation are processed color by color and then fed to a printer.

9 Claims, 25 Drawing Sheets

| 0 | 0 | 0 |
|---|---|---|
| 0 | 1 |   |

| 1 | 1 | 0 |
|---|---|---|
| 0 | 0 |   |

| 0 | 1 | 0 |
|---|---|---|
| 0 | 1 |   |

|   |   |   |
|---|---|---|
| 1 | 1 | 1 |
| 0 | 0 |   |

|   |   |   |
|---|---|---|
| 0 | 1 | 1 |
| 1 | 0 |   |

|   |   |   |
|---|---|---|
| 0 | 1 | 1 |
| 0 | 1 |   |

| 1 | 1 | 1 |
|---|---|---|
| 1 | 0 |   |

| 1 | 1 | 1 |
|---|---|---|
| 0 | 1 |   |

| 1 | 1 | 1 |
|---|---|---|
| 1 | 1 |   |

D22b=31

|   | 0 | 0 |   |
|---|---|---|---|
| 0 | 0 | 0 | 0 |
|   | 0 | 0 | 0 |

D33b = 0

|   | 0 | 0 |   |
|---|---|---|---|
| 0 | 1 | 0 | 0 |
|   | 0 | 0 | 0 |

|   | 0 | 0 |   |
|---|---|---|---|
| 0 | 1 | 0 | 0 |
| 0 | 0 | 1 |   |

|   | 0 | 0 |   |
|---|---|---|---|
| 0 | 0 | 1 | 0 |
| 0 | 1 | 1 |   |

|   | 0 | 0 |   |
|---|---|---|---|
| 0 | 1 | 1 | 0 |
| 0 | 1 | 1 |   |

|   | 0 | 1 |   |
|---|---|---|---|
| 0 | 1 | 1 | 1 |
| 0 | 1 | 0 |   |

|   | 0 | 0 |   |
|---|---|---|---|
| 0 | 1 | 1 | 1 |
| 0 | 1 | 1 |   |

|   | 0 | 0 |   |
|---|---|---|---|
| 0 | 1 | 1 | 1 |
| 1 | 1 | 1 |   |

|   | 0 | 1 |   |
|---|---|---|---|
| 0 | 1 | 1 | 1 |
|   | 1 | 1 | 1 |

|   | 0 | 1 |   |
|---|---|---|---|
| 1 | 1 | 1 | 1 |
|   | 1 | 1 | 1 |

|   | 1 | 1 |   |
|---|---|---|---|
| 1 | 1 | 1 | 1 |
|   | 1 | 1 | 1 |

D33b = 31

APPARATUS FOR CONVERTING AND PROCESSING INPUT BI-LEVEL IMAGE DATA AND FAITHFULLY RENDERING TONES, COLORS, AND EDGES

BACKGROUND OF THE INVENTION

The present invention relates to a digital image recorder and a digital color image recorder capable of handling halftone and, more particularly, to an image recorder of type converting input bilevel image data to multilevel data, executing various kinds of image processing with the multilevel data, and then recording the processed data.

Japanese Patent Publication No. 126778/1989 discloses an image processor including binarizing means for transforming multilevel image data to bilevel data while preserving the densities of the multilevel data. The bilevel data from the binarizing means is written to store means. Quantizing means converts the bilevel data read out of the store means to multilevel data while reproducing the densities. Converting means executes enlargement or reduction with the multilevel data from the quantizing means. Switching means switches the input of the binarizing means to multilevel data from the outside or to the multilevel data from the converting means. The binarizing means is implemented with an error scattering method. When a printer is capable of recording each color in two levels, only eight colors can be rendered.

The problem with the above-described image processor is that since the binarizing means binarizes image data in such a manner as to preserve densities, it is not practicable with bilevel image data generated by ordinary binarizing methods or character pattern data which are originally bilevel or, if practicable, would degrade the image quality. The conventional image processor, which uses a bilevel printer, is not applicable to a printer operable in three or more levels and, therefore, needs the previously mentioned store means or image memory. The quantizing means or bilevel-to-multilevel converting means simply produces a mean value of the densities of a 3×3 pixel area and does not reproduce original multilevel data faithfully. Moreover, such quantizing means reduces resolution. In addition, the simple mean value of the 3×3 pixel area results in only zero to nine levels, i.e., ten levels in total.

SUMMARY OF THE INVENTION

It is, therefore, an object of the present invention to provide a digital image recorder capable of rendering the tones of input image data faithfully even if the input image data is bilevel data preserving densities.

It is another object of the present invention to provide a digial image recorder capable of recording edges, particularly edges of curves and oblique lines, smoothly when input image data is bilevel data derived from a fixed slice level or bilevel dot pattern type character font data.

It is another object of the present invention to provide a digital image recoder capable of rendering tones desirably when input bilevel image data is produced by a systematic dither method or by reading a dot image and using a fixed slice level, and capable of insuring satisfactory resolution when tones and edges should be smoothly rendered.

It is another object of the present invention to provide a digital image recorder capable of recording bilevel image data of each color not only in eight colors but also in multiple colors, and capable of recoding bilevel color data desirably even when each color data preserves color information.

In accordance with the present invention, an image recorder comprises a bilevel-to-multilevel converting section for converting input bilevel image data to M-level data (M being equal to or greater than 3) and comprising a filter having weighting coefficients, a requantizing section for converting multilevel data to N-level data (N being equal to or greater than 2 and smaller than M), and a recording section capable of recording a single pixel in any one of N levels. Input image data is converted to M-level data by the bilevel-to-multilevel converting section, then converted to N-level data by the requantizing section, and then recorded by the recording section.

Also, in accordance with the present invention, an image recorder comprises a plurality of bilevel-to-multilevel converting sections each being assigned to respective one of a plurality of separated colors for converting bilevel image data of associated color to M-level data of that color (M being equal to or greater than 3), a plurality of requantizing sections each being associated with the plurality of bilevel-to-multilevel converting sections for converting the M-level data of particular color to N-level data (N being equal to or greater than 2 and smaller than M), and a printer capable of recording data in N levels per pixel in each color. Bilevel image data of the plurality of colors are each converted to M-level data by a filter incorporated in associated one of the bilevel-to-multilevel converting sections and having weighting coefficients, then converted to N-level data by associated one of the requantizing sections, and then recorded by the printer.

BRIEF DESCRIPTION OF THE DRAWINGS

The above and other objects, features and advantages of the present invention will become more apparent from the following detailed description taken with the accompanying drawings in which:

FIG. 10 shows a bidimensional distribution of pixels which the bilevel-to-multilevel conversion shown in FIG. 1 references for conversion and the bilevel data thereof;

FIGS. 11-22 each shows specific data of pixels which a bilevel-to-multilevel conversion shown in FIG. 9 references for conversion and converted multi-level data;

FIG. 27 shows a pixel distribution which one of two different bilevel-to-multilevel conversion processing by the bilevel-to-multilevel conversion shown in FIG. 26 uses and symbols given to the bilevel data of individual pixels;

FIGS. 28-38 each shows a particular pixel data distribution which the bilevel-to-multilevel conversion of FIG. 26 references for conversion and converted multi-level data;

DESCRIPTION OF THE PREFERRED EMBODIMENTS

Figure 1:
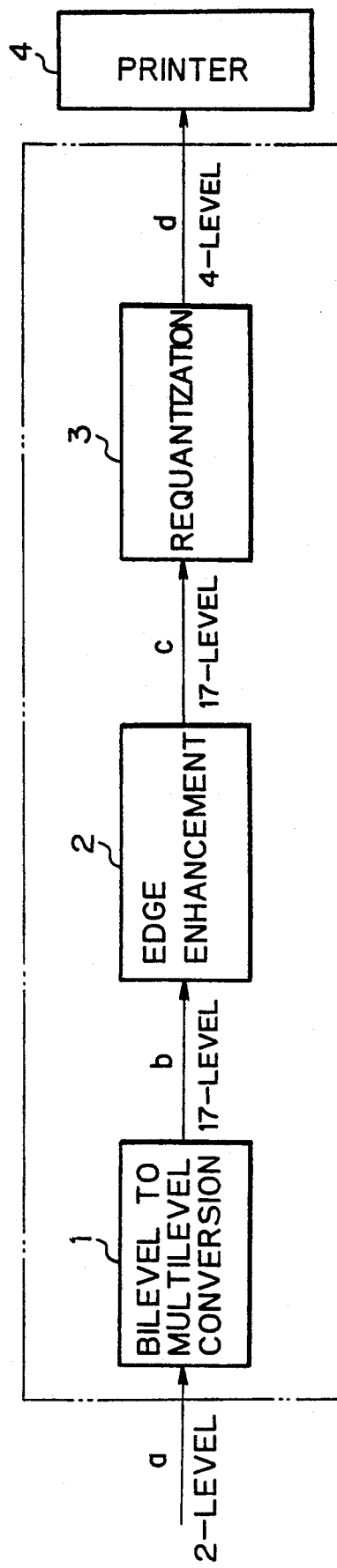
FIG. 1 is a block diagram schematically showing a first embodiment of the present invention.

Referring to FIG. 1 of the drawings, a first embodiment of the image recorder in accordance with the present invention is shown. There are shown in the figures an input bilevel image data a, image data b converted to 17-level data, data c produced by subjected the signal c to edge enhancement, and data d requantized to 4-level data. A bilevel-to-multilevel conversion 1 converts bilevel image data to 17-level data by smoothing the former by a bidimensional filter. An edge enhancement 2 is provided for the above-mentioned edge enhancing processing. A laser beam printer 4 records tones in four levels per pixel by pulse width modulation (PWM). The bilevel-to-multilevel conversion 1, edge enhancement 2 and requantization 3 will hereinafter be referred to as image processing collectively.

Figure 2:
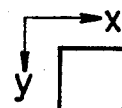
FIG. 2 shows weighting coefficients particular to smoothing filter processing to be executed by a bilevel-to-multilevel conversion included in the embodiment and corresponding to 3×3 matrix.
Figure 3:
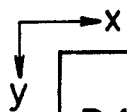
FIG. 3 shows a bidimensional distribution of pixels of input image data surrounding a pixel of interest which should be converted.

FIG. 2 shows the distribution of weighting coefficients corresponding to a 3×3 pixel matrix which the filter of the bilevel-to-multilevel conversion 1 uses for smoothing the bilevel image data. Assume that input image data are distributed bidimentionally, as shown in FIG. 3, that the data D22 at the center of the matrix is smoothed, and that the smoothed data is D22$b$. Then, the smoothed data D22$b$ is produced by:

$$D22b = 1 \cdot D11 + 2 \cdot D12 + 1 \cdot D13 + \\ 2 \cdot D21 + 4 \cdot D22 + 2 \cdot D23 + \\ 1 \cdot D31 + 2 \cdot D32 + 1 \cdot D33$$

Since the sum of the coefficients of the matrix is 16 and D11-D33 are ZERO or ONE, D22$b$ may have any one of seventeen values, i.e., 0-16. The filter, therefore, converts bilevel image data to 17-level image data.

Figure 4:
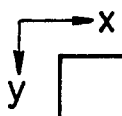
FIG. 4 shows weighting coefficients assigned to an edge enhancement also included in the embodiment and corresponding to a 3×3 matrix.

FIG. 4 shows the distribution of weighting coefficients corresponding to a 3×3 pixel matrix which is assigned to the edge enhancement 2. The edge enhancement is implemented as high-pass filter processing. The center of the matrix corresponds to a pixel whose edge should be enhanced. Assuming the signal B (D22$b$) undergone high-pass filter processing is D22$c$, then D22$c$ is expressed as $$D22c = \begin{matrix} & -1/2 \cdot D12b & \\ -1/2 \cdot D21b & +3 \cdot D22b & -1/2 \cdot D23b \\ & -1/2 \cdot D32b & \end{matrix}$$

When the bilevel image data a is representative of a single isolated dot or a thin line whose width is one dot, it will be transformed to a value of low tonal level by the previous smoothing filter processing (D22$a$). In this respect, the high-pass filter processing performs correction to raise the tonal level of such data. This allows even an isolated dot and a thin line to be reproduced with a minimum of omission.

Figure 5:
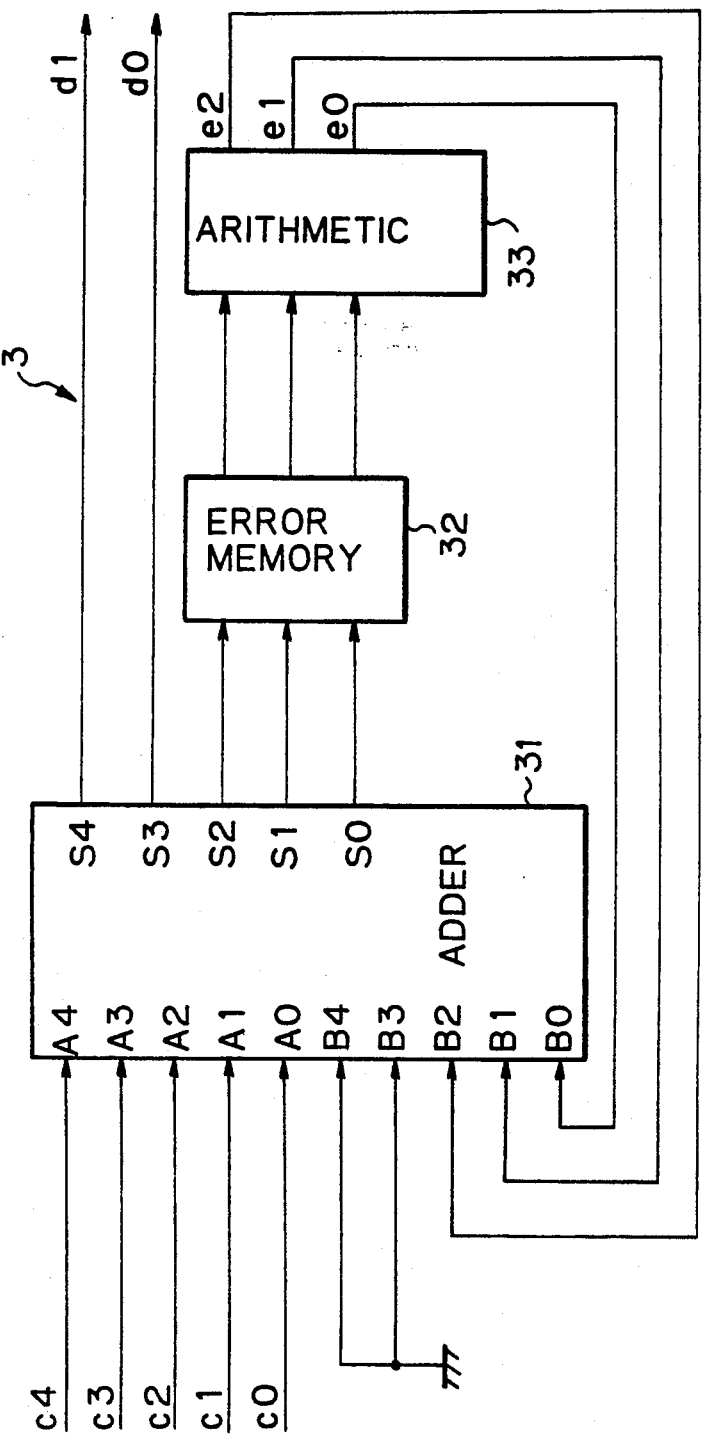
FIG. 5 is a block diagram schematically showing a specific construction of a requantization included in the embodiment.

FIG. 5 shows a specific construction of the requantization 3 for converting the input 17-level data C (D22$c$) to 4-level data D (D22$d$) by the 4-level error scattering. The 17-level signal (D22$b$ or D22$c$) is represented by five bits. Among the seventeen levels, 0 and 16 are represented by "00000" and "10000", respectively. In the figure, signals c0-c4 correspond to the signal C (Cr), FIG. 39; 16, for example, is represented by c4=1 and c0-c3=0. The adder 31 produces a sum S:

$$S(S0-S4) = A(A0-A4) + B(B0-B4)$$

Figure 6:
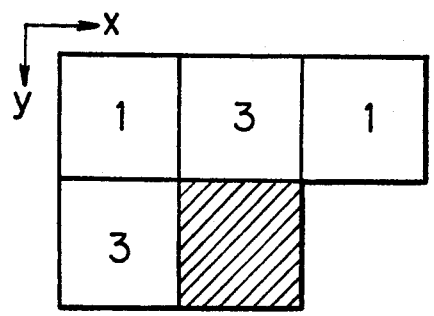
FIG. 6 shows pixels for scattering the conversion error of a pixel of interest (hatching) and weighting coefficients for scattering in the processing of the requantization.
Figure 7:
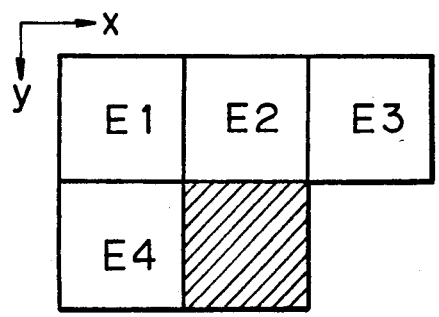
FIG. 7 shows by symbols the pixels for scattering the conversion error of a pixel of interest (hatching) and scattered error values in the processing of the quantization.

Upper two bits S4 and S3 of the sum S are outputted as signals d1 and d0 which are a 2-bit 4-level requantized signal. The signals d1 and d0 correspond to the signal D (Dr), FIG. 1. Among the sum S, lower three bits S2, S1 and S0 are representative of an error involved in the requantization and temporarily stored in a memory 32. An arithmetic unit 33 weighs the errors of pixels surrounding the pixel of interest in matching relation to the positions of the pixels, sums the weighted errors, and then produces a mean value of the weighted values. A pixel matrix representing the weighting coefficients associated with the pixel positions will be referred to as a weight matrix. In this embodiment, a weight matrix shown in FIG. 6 is used. In FIG. 6, the block indicating by hatching is the pixel of interest, i.e., the current signal C (c0-c4; D22$c$). As shown in FIG. 6, a particular weight is assigned to each pixel surrounding the pixel of interest and having been requantized, on the basis of the distance from the pixel of interest. As shown in FIG. 7, assume that error data written to the error memory 32 in association with the pixels shown in FIG. 6 are E1-E4. Then, the error data e particular to the pixel of interest is expressed as:

$$e = (1 \cdot E1 + 3 \cdot E2 + 1 \cdot E3 + 3 \cdot E4)/8$$

Upper three bits of the result of calculation are outputted as e2, e1 and e0 and connected to lower three bits (B2, B1 and B0) of the input terminal B of the adder 31. In FIGS. 6 and 7, x and y indicate respectively the main scanning direction and the subscanning direction in the printer 4.

The error memory 32 has a 1-line buffer memory for temporarily storing the errors (E1, E2 and E3) of a line immediately preceding the pixel of interest, and a shift register for temporarily storing the error (e.g. E4) of the pixel located on the same line as the pixel of interest and immediately preceding the latter. The operation of the requantization 3 shown in FIG. 5 may be summarized as follows. 1) Correcting c(D22c) on the basis of the errors of surrounding pixels by using $$\begin{aligned} S &= A + B \\ &= c + e \\ &= c + (1 \cdot E1 + 3 \cdot E2 + 1 \cdot E3 + 3 \cdot E4)/8; \end{aligned}$$

2) Extracting upper two bits of the sum S to requantize them to four levels; and 3) Temporarily storing lower three bits of the sum S in the memory 32 as an error particular to the pixel of interest, the error being used for correcting surrounding pixels later.

As stated above, the 17-level to 14-level requantization is effected while preserving the tonality of the signal C (D22c).

The printer modulates four kinds of pulse widths in association with the 2-bit 4-level image data d (D22d) and thereby records tones in four levels per pixel.

It should be noted that the bilevel-to-multilevel conversion may be implemented with means other than the smoothing filter, and that the size and coefficients of the smoothing filter are open to choice. The requantization may use a method other than the error scattering method, and the circuitry shown in FIG. 5 adapted for the error scattering method may be modified, as desired. The bilevel-to-multilevel conversion is not limited to bilevel-to-17-level conversion while the requantization is practicable with any desired number of levels other than four. In addition, conventional magnification change, gamma correction and other conventional processing are applicable to the embodiment. The laser beam printer is not limitative and may be replaced with an ink jet printer or a thermal printer, for example.

Figure 8:
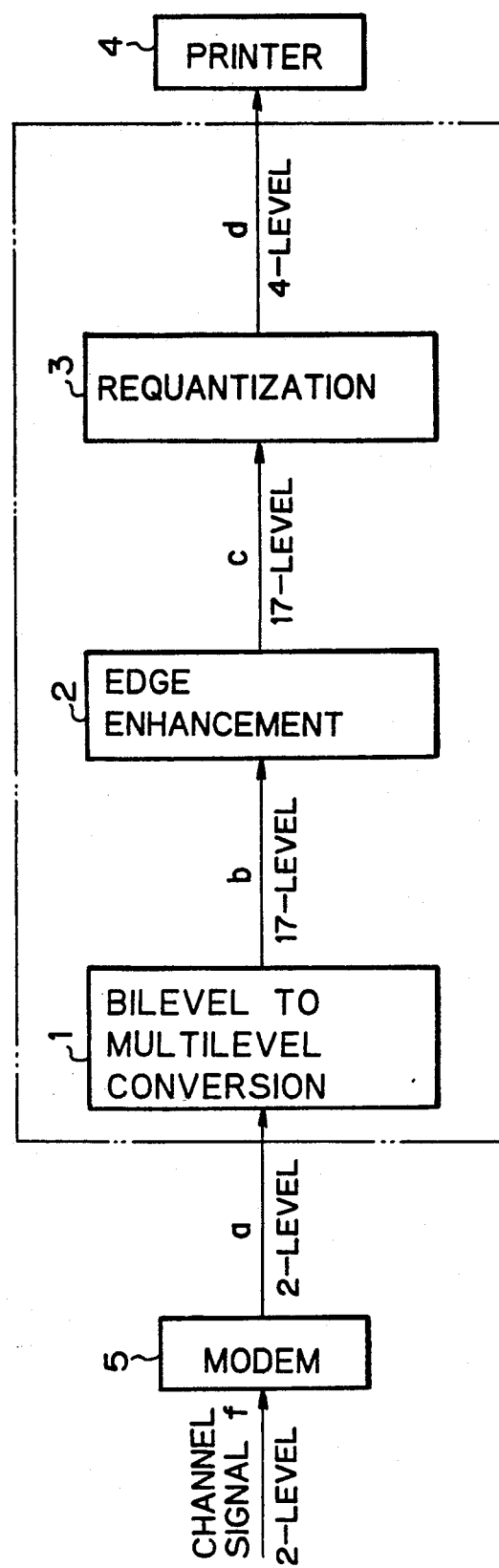
FIG. 8 is a block diagram showing a second embodiment of the present invention.

FIG. 8 shows a second embodiment of the present invention which is 3 implemented as a facsimile apparatus. In a facsimile apparatus, the path extending at least to a modem 5 handles the received signal as bilevel image data due to the inherent specifications of a transmission channel, transmission time and modem limitations and to enhance simplification and cost-effectiveness. Even in such conditions, this embodiment promotes desirable bilevel or multilevel image recording.

The first and second embodiments described above achieve various advantages, as enumerated below.

(1) Tones are rendered in response to input image data.

(2) Especially, when the input image data is bilevel data of the kind preserving color information, tones are reproduced faithfully.

(3) Edges are smoothly rendered.

(4) Concerning the advantage (3), when input image data is bilevel image data derived from a fixed slice level or bilevel dot pattern type character font data, edges, particularly, the edges of a curve and that of an oblique line, is smoothly recorded.

(5) Tones are desirably recorded when input image data has been binarized by a systematic dither method or binarized by a fixed slice level after reading a dot image.

(6) A high resolution is insured in relation to the advantage (4).

(7) Edge enhancement, magnification change and gamma correction are effected in a desirable manner since the data to be processed is multilevel data.

(8) Even when input bilevel image data is representative of an isolated single dot or a line image having a one doth width, it is reproduced without having the density thereof reduced or without being lost due to the edge enhancement. Especially, when the means for converting bilevel data to multilevel data is implemented by smoothing means as in the embodiment, the advantage attainable with edge enhancement is especially prominent.

Figure 9:
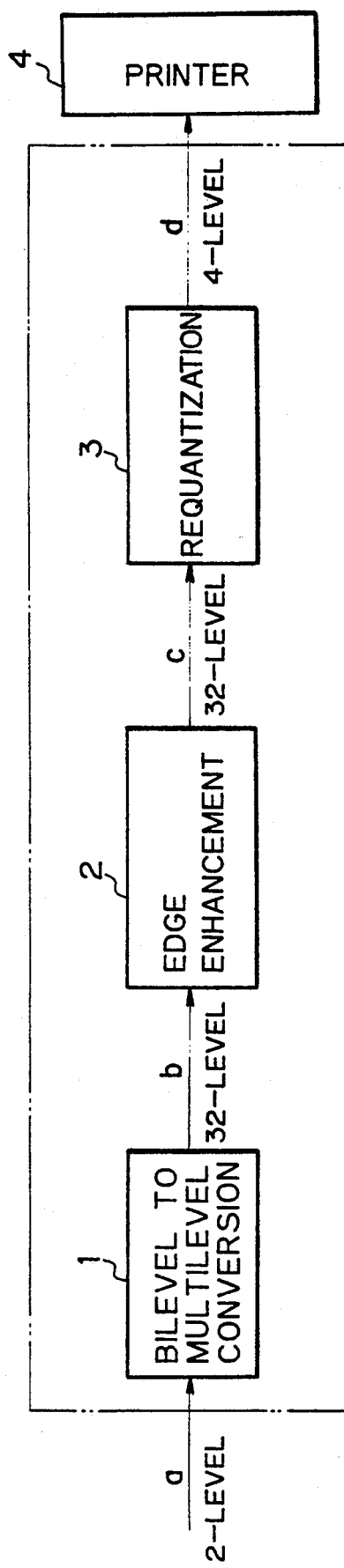
FIG. 9 is a block diagram showing a third embodiment of the present invention.

FIG. 9 shows a third embodiment of the present invention. There are shown in the figures an input bilvel image data a, image data b converted to 32-level data, data c produced by subjected the signal b to edge enhancement, and data d requantized to 4-level data. A bilevel-to-multilevel conversion 1 converts bilevel image data to 32-level data by pattern comparison. An edge enhancement 2 executes edge enhancement by filter processing. A quantization 3 requantizes the 32-level data to 4-level data by an error scattering method. A laser beam printer 4 records tones in four levels per pixel by PWM. The bilevel-to-multilevel conversion 1, edge enhancement 2 and requantization 3 will hereinafter be referred to as image processing collectively.

Figures 10, 11, 12:
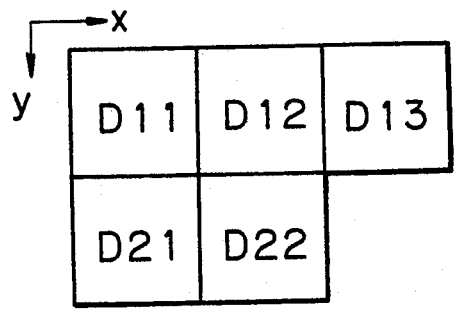

FIG. 10 shows a specific matrix for pattern comparison executed for bilevel-to-multilevel conversion. In FIG. 10, five pixels D11, D12, D12, D21 and D22 are the pixels to be compared, and the pixel D22 is the pixel to be converted. The bilevel-to-multilevel converted data associated with D22 is expressed as:

$$D22b = f(D11, D12, D13, D21, D22)$$

where f is a function for pattern comparison. D11–D22 are input bilevel image data which are ZERO or ONE. Examples of the function f are shown in FIGS. 11–21. In the embodiment, since D22b is assumed to have any one of values 0–31, conversion to thirty-two different levels is achievable. While the five pixels D11–D22 may be combined in any one of thirty-two different ways, only typical combinations are shown.

Figure 22:
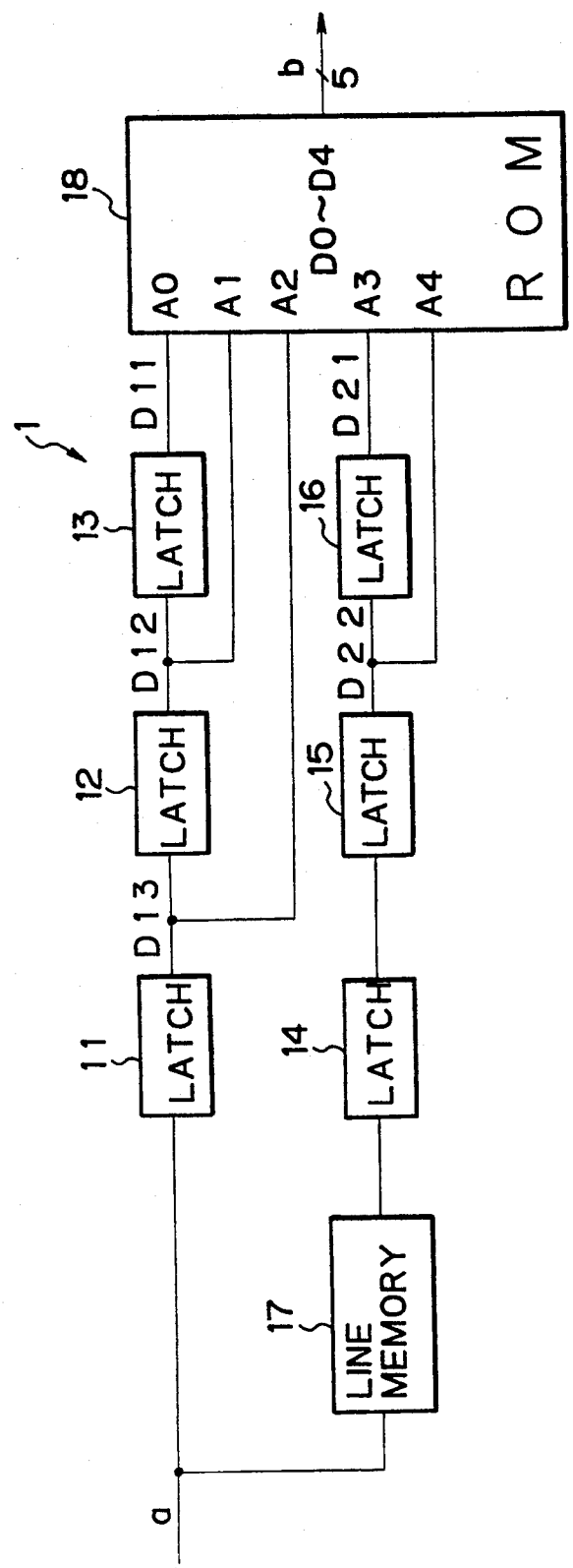

A specific construction of the bilevel-to-multilevel conversion 1 is shown in FIG. 22 which calculates the 32-level data of the pixel of interest D22 from the matrix data shown in FIG. 10. As shown, the conversion 1 has latches 11–16, a line memory 17, and an 18-byte ROM. The bilevel signal a (D22) is applied to the latch 11 and line memory 17. Since all the latches and line memory are operated in synchronism with a pixel clock, the data is delayed by on pixel relative to the input pixel when passed through one latch or by one line when passed through the line memory 17. As a result, the bilevel data of the matrix distribution shown in FIG. 10 are applied to the address of the ROM 18 at the same time. Specifically, the data D13, D12, D11, D22 and D21 are applied from the latches 11, 12, 13, 15 and 16, respectively. The 5-bit signal from the five latches is used to address the ROM 18. The conversion patterns shown in FIGS. 11-21 are stored in the ROM 18 beforehand, so that a 32-level signal b (D22b) matching the input pattern may be outputted. Here, the signal b (D22b) is the value of D22b shown in any one of FIGS. 11-12.

The edge enhancement 2 is operated in the same manner as described in relation to the first embodiment and uses the weighting coefficients shown in FIG. 4.

Figure 23:
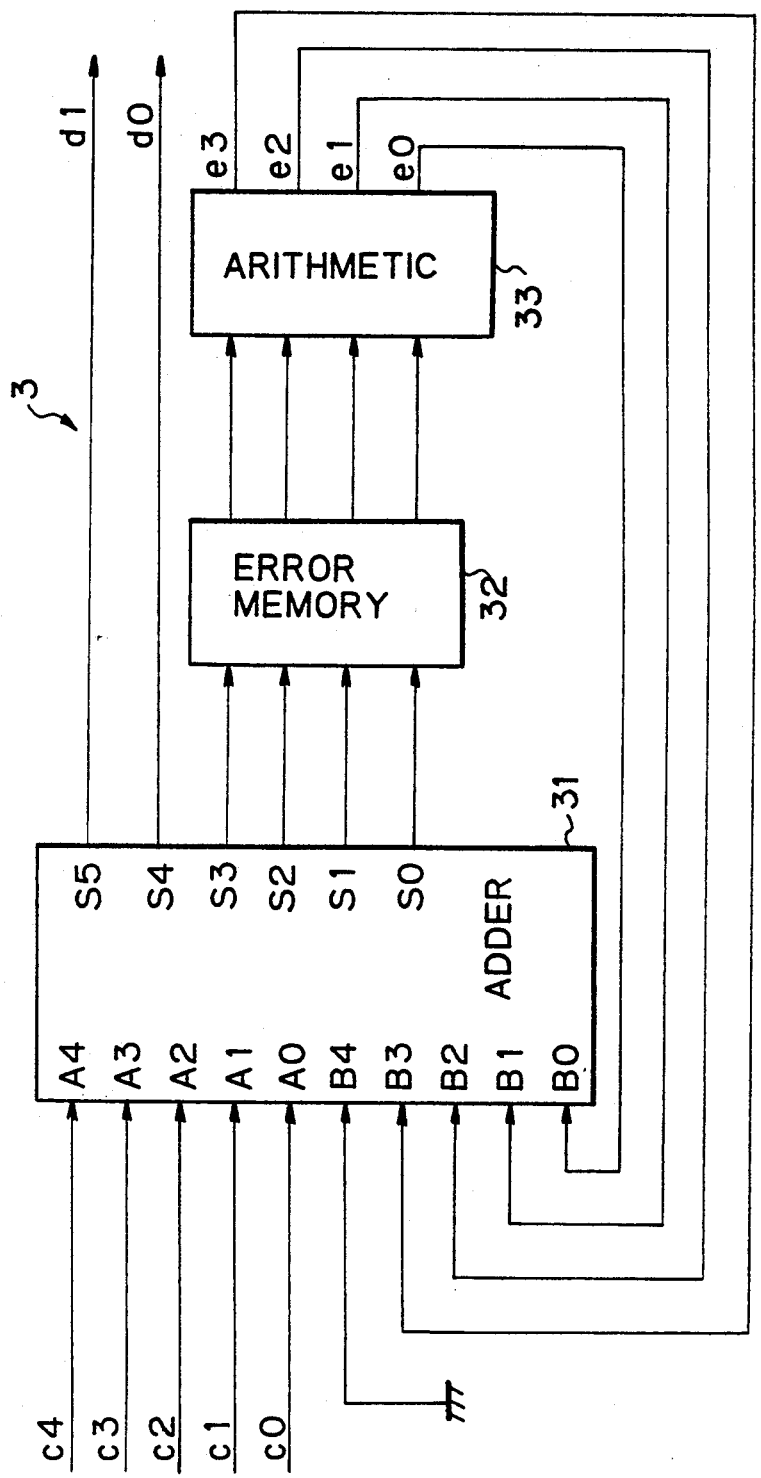
FIG. 23 is a block diagram schematically showing a specific construction of a requantization included in the fourth embodiment.
Figure 24:
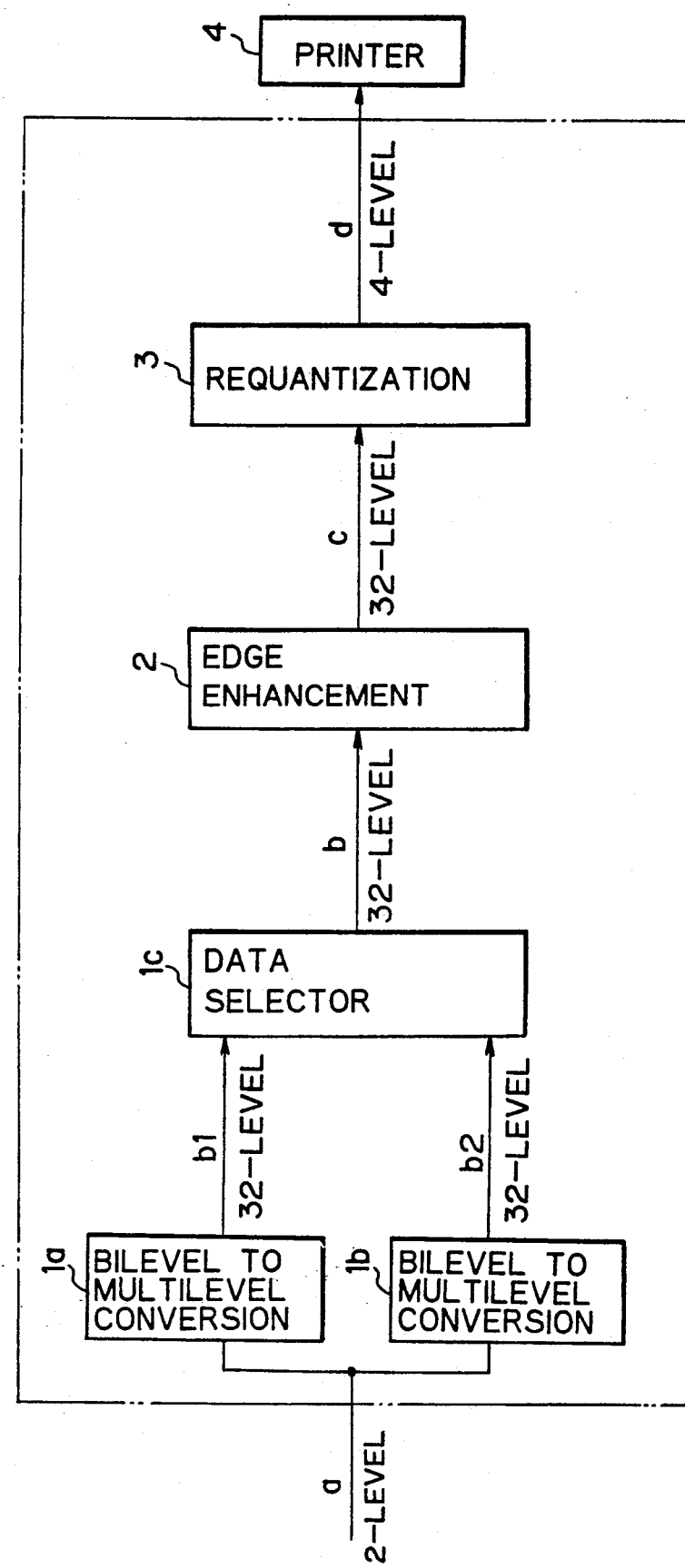
FIG. 24 is a block diagram showin a fifth embodiment of the present invention.

FIG. 23 shows a specific construction of the requantization 3 for converting the input 32-level data (D22c) to 4-level data (D22d) by a 4-level error scattering method. The 32-level signal (D22b or D22c) is represented by five bits. Among the thirty-two levels, 0 and 32 are represented by "00000" and "11111", respectively. In the figure, signals c0-c4 correspond to the signal c, FIG. 9; 16, for example, is represented by c4=1 and c0-c3=0. An adder 31 produces a sum S:

$$S(S0-S5) = A(A0-A4) + B(B0-B4)$$

Upper two bits S4 and S5 of the sum S are outputted as signals d1 and d0 which are a 2-bit 4-level requantized signal. The signals d1 and d0 correspond to the signal d, FIG. 9. Among the sum S, lower four bits S3, S2, S1 and S0 are representative of an error involved in the requantization and temporarily stored in the error memory 32. The arithmetic unit 33 weighs the errors of pixels surrounding the pixel of interest in matching relation to the positions of the pixels, sums the weighted errors, and then produces a mean value of the weighted values. Again, a pixel matrix representing the weighting coefficients associated with the pixel positions will be referred to as a weight matrix. In this embodiment, the weight matrix shown in FIG. 6 is also used. In FIG. 6, the block indicating by hatching is the pixel of interest, i.e., the current signal c (c0-c4; D22c). As shown in FIG. 6, a particular weight is assigned to each pixel surrounding the pixel of interest and having been requantized, on the basis of the distance from the pixel of interest. As shown in FIG. 7, assume that error data written to the error memory 32 in association with the pixels shown in FIG. 6 are E1-E4. Then, the error data e particular to the pixel of interest is expressed as:

$$e = (1 \cdot E1 + 3 \cdot E2 + 1 \cdot E3 + 3 \cdot E4)/8$$

Upper four bits of the result of calculation are outputted as e3, e2, e1 and e0 and connected to lower four bits (b3, B2, B1 and B0) of th input terminal B of the adder 31. In FIGS. 6 and 7, x and y indicate respectively the main scanning direction and the subscanning direction in the printer 4.

The error memory 32 has a 1-line buffer memory for temporarily storing the errors (E1, E2 and E3) of a line immediately preceding the pixel of interest, and a shift register for temporarily storing the error (e.g. E4) of the pixel located on the same line as the pixel of interest and immediately preceding the latter. The operation of the requantization 3 shown in FIG. 23 may be summarized as follows.

1) Correcting c (D22c) on the basis of the errors of surrounding pixels by using $$\begin{aligned} S &= A + B \\ &= c + e \\ &= c + (1 \cdot E1 + 3 \cdot E2 + 1 \cdot E3 + 3 \cdot E4)/8; \end{aligned}$$

2) Extracting upper two bits of the sum S to requantize them to four levels; and 3) Temporarily storing lower four bits of the sum S in the memory 32 as an error particular to the pixel of interest, the error being used for correcting surrounding pixels later.

As stated above, the 32-level to 4-level requantization is effected while preserving the tonality of the signal c (D22c).

A fourth embodiment of the present invention will be described with reference to FIG. 3 which executes density conversion simultaneously with the above-stated bilevel-to-multilevel conversion. This embodiment also uses the matrix shown in FIG. 10, but it samples the multilevel signal D22b every thee pixel clock in the main scanning direction and every three line clock in the subscanning direction. With this embodiment, it is possible to perform density conversion for converting the area occupied by nine pixels to multiple levels and thereby converting the nine pixes to a single pixel.

It should be noted that the pattern for bilevel-to-multilevel conversion shown in FIG. 10 is only illustrative and may be changed in size and configuration. The requantization may use a method other than the error dispersion method, and the circuitry shown in FIG. 23 adapted for the error scattering method may be modified, as desired. The bilevel-to-multilevel conversion is not limited to bilevel-to-32-level conversion while the requantization is practicable with any desired number of levels other than four. In addition, the printer is not limited to a laser printer and may be replaced with an ink jet printer, thermal printer, etc.

The third and fourth embodiments described above have the following advantages.

(1) Tonal recording is achievable on the basis of input image data.

(2) Especially, when the input image data is binary data of the kind preserving densities, tones can be reproduced in a desirable manner.

(3) Edges can be smoothly rendered.

(4) Concerning the advantage (3), edges, particularly those of a line and an oblique line can be smoothly recorded when the input image data is bilevel image data derived from a fixed slice level or dot pattern type character font data.

(5) Tones can be rendered faithfully when the input image data is bilevel data produced by a systematic dither method or binary data produced by reading a dot image and binarizing the resulting data with a fixed slice level.

(6) A desirable resolution is achievable in relation to the advantage (4).

In addition, the fourth embodiment can effect density conversion without resorting to special hardware.

Figure 25:
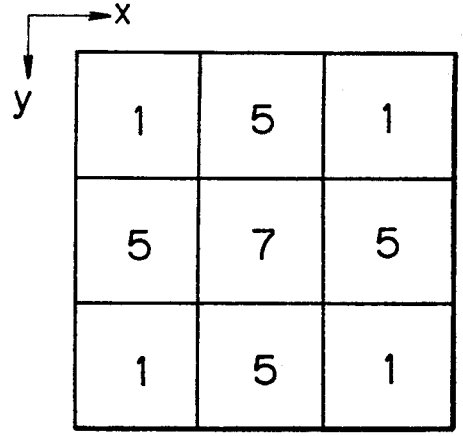
FIG. 25 shows the distribution of specific weighting coefficients for implementing smoothing filter processing in a bilevel-to-multilevel conversion shown in FIG. 24.

Referring to FIG. 25, fifth embodiment of present invention is shown. There are shown in the figures input bilevel image data a, 32-level image data b produced from the bilevel data a, 32-level image data c produced by subjecting the signal b to edge enhancement, and image data d requantized to four levels. A bilevel-to-multilevel conversion 1a is implemented with the construction shown in FIG. 9 and described in relation to the third embodiment and executes bilevel-to-32-level conversion by pattern comparison. The bilevel-to-multilevel conversion 1a is constructed in the same manner as the conversion 1 of the first embodiment and uses a smoothing filter shown in FIG. 25. Specifically, the conversion converts bilevel data to 32-level data to produce data D22b:

$$D22b = 1 \cdot D11 + 5 \cdot D12 + 1 \cdot D13 + \\ 5 \cdot D21 + 7 \cdot D22 + 5 \cdot D23 + \\ 1 \cdot D31 + 5 \cdot D32 + 1 \cdot D33$$

A selector 1c selects either one of the signals (D22b) from two bilevel-to-multilevel conversions 1a and 1b in response to a select signal s and transfers it to the edge enhancement. The select signal s changes to ZERO or ONE as a conversion mode key provided on the operation board of a device, not shown, is operated. Alternatively, the select signal may be so switched over depending on whether the input image data is representative of a character or whether it is representative of a picture. The edge enhancement 2 enhances edges by filter processing. The requantization converts 32-level data to 4-level data. The laser beam printer 4 records tones in four levels per pixel by PWM. The blocks 1a, 1b and 1c will be referred to as image processing collectively.

The edge enhancement 2 performs the same operation as the edge enhancement 2 of the first embodiment and uses the weighting coefficients shown in FIG. 4. The requantization 3 is also constructed as shown in FIG. 23 and converts input 32-level data (D22c) to 4-level data (D22d) by the 4-level error scattering method.

The fifth embodiment described above may be modified or changed, as follows. The pattern for bilevel-to-multilevel conversion shown in FIG. 10 may be replaced with any other suitable pattern, and the size and configuration of the pattern matrix may be changed, as desired. Regarding a smoothing filter, the size and coefficients thereof may be changed, as needed. The bilevel-to-multilevel conversion may be switched over not only on the basis of picture/character images but also on the basis of dot images. The requantization may use a method other than the error dispersion method, and the circuitry shown in FIG. 23 adapted for the error scattering method may be modified, as desired. The bilevel-to-multilevel conversion is not limited to bilevel-to-32-level conversion while the requantization is practicable with any desired number of levels other than four. In addition, the printer is not limited to a laser printer and may be replaced with an ink jet printer, thermal printer, etc.

The fifth embodiment described above achieves the following advantages.

(1) Tonal recording is achievable on the basis of input image data.

(2) Especially, when the input image data is bilevel data of the kind preserving densities, tones can be reproduced in a desirable manner.

(3) Edges can be smoothly rendered.

(4) Concerning the advantage (3), edges, particularly those of a line and an oblique line can be smoothly recorded when the input image data is bilevel image data derived from a fixed slice level or dot pattern type character font data.

(5) Tones can be rendered faithfully when the input image data is bilevel data produced by a systematic dither, method or bilevel data produced by reading a dot image and binarizing the resulting data with a fixed slice level.

(6) A desirable resolution is achievable in relation to the advantage (4).

(7) Data can be recorded in an optimal manner in matching relation to the kind of input image data which may be character data or picture data and has been processed by a particular binarizing system.

Figure 26:
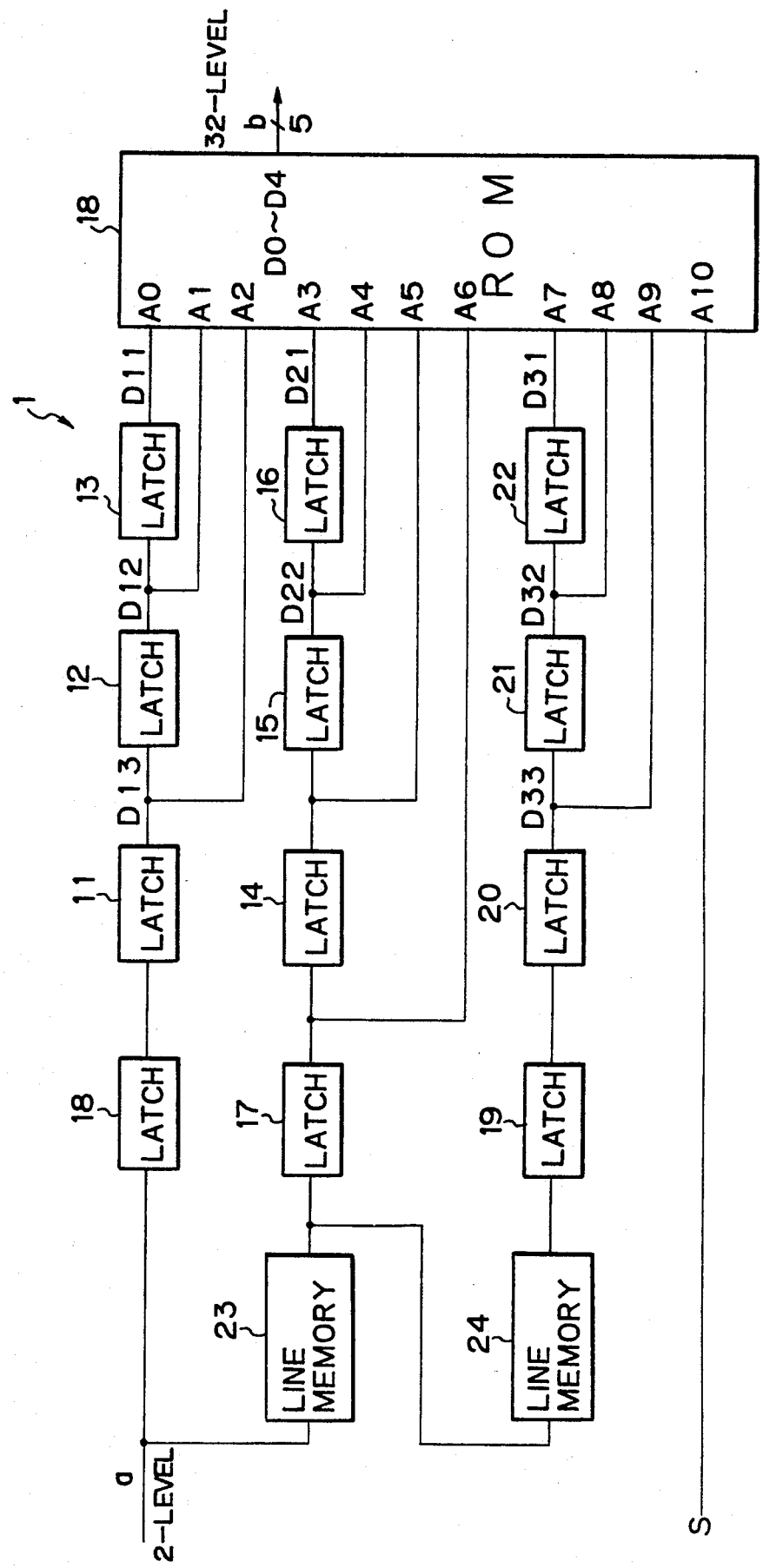
FIG. 26 is a block diagram schematically showing a specific construction of a bilevel-to-multilevel conversion included in a sixth embodiment of the present invention.
Figures 27, 28, 29:
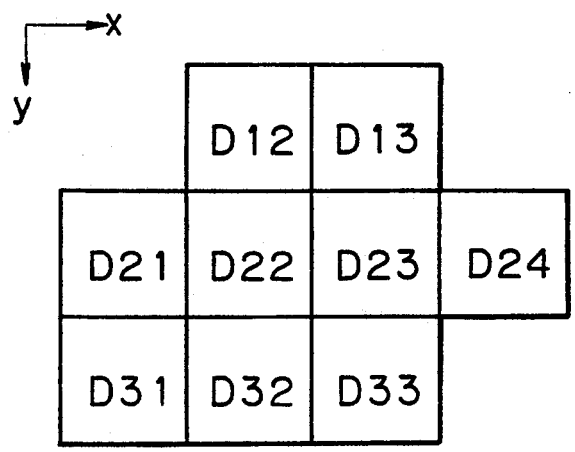

A sixth embodiment of the present invention will be described which is generally constructed as shown in FIG. 9. This embodiment is essentially similar to the third embodiment except for the bilevel-to-multilevel conversion 1. As shown in FIG. 26, the bilevel-to-multilevel conversion 1 of this embodiment selectively effects either one of two different conversions for converting bilevel data to 32-level data. A first conversion is the same as the conversion of the third and fourth embodiments. The matrix for pattern comparison shown in FIG. 10 implements the a first conversion. In FIG. 10, pixels D11, D12, D13, D21 and D22 are the pixels to be compared and, among them, the pixel D22 is the pixel to be converted. Assuming the converted data of the pixel D22 of interest is D22b, D22b is expressed as:

$$D22b = f(D11, D12, D13, D21, D22)$$

where f is a function for pattern comparison. D11–D22 are the input bilevel image data each having a value of ZERO or ONE. FIGS. 11–21 show specific functions f applicable to the embodiment. In the illustrative embodiment, since D22b is assumed to have any one of thirty-two values, i.e., 0–31, bilevel to 32-level conversion is attainable. The five pixels D11–D22 may be combined in three different ways. It should be noted that the combination shown in the figure is only illustrative. A second conversion converts bilevel data to 32-level data on the basis of bilevel data of nine pixels. FIG. 27 shows a specific matrix for pattern comparison which implements the second bilevel-to-multilevel conversion. In FIG. 27, nine pixels D12, D13, D21, D22, D23, D24, D31, D32 and D33 are the pixels to be compared and, among them, the pixel D33 is the pixel of interest. The multi-level data D33b associated with the pixel D33 is expressed as:

$$D33b = g(D12, D13, D21, D22, D23, D24, D31, D32, D33)$$

where g is a function for pattern comparison. D12–D22 are input bilevel image data each being ZERO or ONE. FIGS. 28–38 show specific functions g. In the illustrative embodiment, since D33b is assumed to have any one of values 0–31, the conversion from binary data to 32-level data is achievable. The nine pixels D12–D33 may be combined in 512 different ways. It should be noted that the combination shown in the figure is only illustrative.

The circuit shown in FIG. 26 has latches 11–22, line memories 23 and 24, and a 2048-byte ROM. The bilevel signal a is applied to the latch 18 and line memory 23. Since all the latches and line memories operate in synchronism with a pixel clock, data is delayed by one pixel relative to the input pixel when passed through one latch and delayed by one line when passed through one line memory. Therefore, the bilevel output data of the latches 11-13 and the bilevel output data of the latches 14-16 provide the data of the pixel matrix shown in FIG. 10 at the same time. Further, the bilevel output data of latches 17 and 20-22 provide the data of the pixel matrix shown in FIG. 27 at the same time. By which of the pixel matrixes the binary data should be converted to 32-level data is determined by controlling the uppermost address A10 of the ROM 25. The select signal c is connected to the uppermost address A10 and switched over to ZERO or ONE by the conversion mode key provided on the operation board of the device, not shown.

The sixth embodiment described above may be modified or changed, as follows. The patterns for bilevel-to-multilevel conversion shown in FIGS. 11-21 and FIGS. 28-38 may be replaced with any other suitable patterns, and the size and configuration of the pattern matrix may be changed, as desired. The requantization may use a method other than the error, scattering method and may requantize in levels other than four levels. In addition, the printer is not limited to a laser printer and may be replaced with an ink jet printer, thermal printer, etc.

The sixth embodiment described above achieves the following various advantages.

(1) Tonal recording is achievable on the basis of input image data.

(2) Especially, when the input image data is bilevel data of the kind preserving densities, tons can be reproduced in a desirable manner.

(3) Edges can be smoothly rendered.

(4) Concerning the advantage (3), edges, particularly those of a line and an oblique line can be smoothly recorded when the input image data is bilevel image data derived from a fixed slice level or dot pattern type character font data.

(5) Tones can be rendered faithfully when the input image data is bilevel data produced by a systematic dither method or bilevel data produced by reading a dot image and binarizing the resulting data with a fixed slice level.

(6) A desirable resolution is achievable in relation to the advantage (4).

(7) Data can be recorded in an optimal manner in matching relation to the kind of input image data which may be character data or picture data and has been processed by a particular binarizing system.

Figure 39:
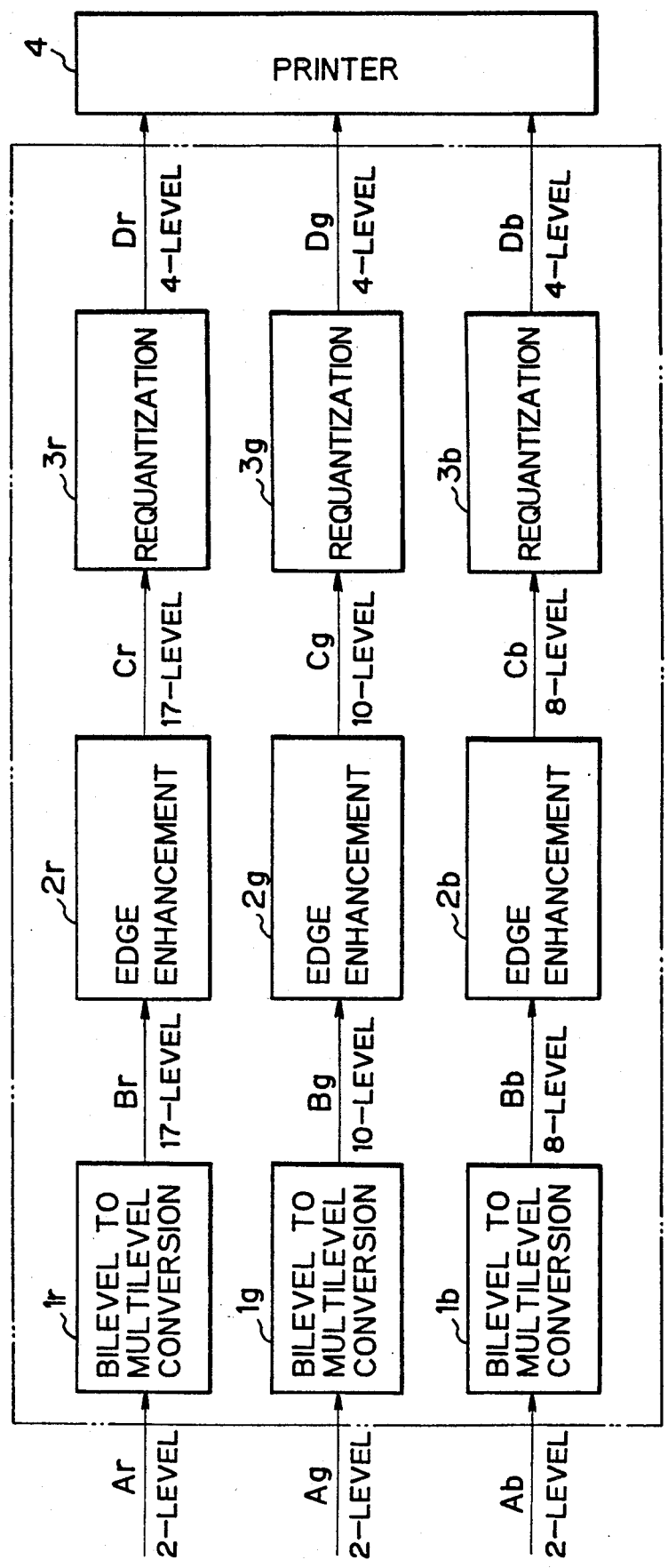
FIGS. 39-41 are block diagrams showing a seventh, eighth and ninth embodiment of the present invention, respectively.

FIG. 39 shows a seventh first embodiment of the present invention is shown. There are shown in the figures red, green and blue signals Ar, Ag and Ab (or A collectively) representative of bilevel color data produced by color separation, multilevel image data Br, Bg and Bb (or B collectively), image data Cr, Cg and Cb (or C collectively) produced from the signals B by edge enhancement, and image data Dr, Dg and Db (or D collectively) requantized to four levels. In the illustrative embodiment, the signals Br, Bg and Bb have seventeen levels, ten levels, and eight levels, respectively. The circuit is made up of bilevel-to-multilevel conversions 1r, 1g and 1b (or 1 collectively) each converting bilevel image data or particular color to multi-level data by a bidimensional filter, edge enhancements 2r, 2g and 2b (or 2 collectively), requantizations 3r, 3g and 3b (or 3 collectively) each transforming the multilevel data of particular color to four levels by the error scattering method, and a PMW type laser beam printer 4 capable of recording tones in four levels per pixel for each color. The bilevel-to-multilevel conversions 1, edge enhancements 2 and requantizations 3 will hereinafter be referred to as image processing collectively.

FIG. 2 shows the distribution of weighting coefficients corresponding to a 3×3 pixel matrix which the filter of each bilevel-to-multilevel conversion 1 uses for smoothing the bilevel image data. Assume that input image data are distributed bidimentionally, as shown in FIG. 3, that the data D22 at the center of the matrix is smoothed, and that the smoothed data is D22$b$. Then, the smoothed data D22$b$ is produced by:

$$D22b = 1\cdot D11 + 2\cdot D12 + 1\cdot D13 + \\ 2\cdot D21 + 4\cdot D22 + 2\cdot D23 + \\ 1\cdot D31 + 2\cdot D32 + 1\cdot D33$$

Since the sum of the coefficients of the matrix is 16 and D11-D33 are ZERO or ONE, D22$b$ may have any one of seventeen values, i.e., 0-16. The filter, therefore, converts bilevel image data to 17-level image data.

FIG. 4 shows the distribution of weighting coefficients corresponding to a 3×3 pixel matrix which is assigned to the edge enhancement 2. The edge enhancement is implemented as high-pass filter processing. The center of the matrix corresponds to a pixel whose edge should be enhanced. Assuming the signal B (D22$b$) undergone high-pass filter processing is D22$c$, the D22$c$ is expressed as $$D22c = \begin{array}{c} -1/2\cdot D12b \\ -1/2\cdot D21b \quad +3\cdot D22b \quad -1/2\cdot D23b \\ -1/2\cdot D32b \end{array}$$

When the bilevel image data a is representative of a single isolated dot or a thin line whose width is one dot, it will be transformed to a value of low tonal level by the previous smoothing filter processing (D22$a$). In this respect, the high-pass filter processing performs correction to raise the tonal level of such data. This allows even an isolated dot and a thin line to be reproduced with a minimum of omission.

FIG. 5 shows a specific construction of each requantization 3 for converting the input 17-level data C (D22$c$) to 4-level data D (D22$d$) by the 4-level error scattering. The 17-level signal (D22$b$ or D22$c$) is represented by five bits. Among the seventeen levels, 0 and 16 are represented by "00000" and "10000", respectively. In the figure, signals c0-c4 correspond to the signal C (Cr), FIG. 39; 16, for example, is represented by c4=1 and c0-c3=0. The adder 31 produces a sum S:

$$S(S0-S4) = A(A0-A4) + B(B0-B4)$$

Upper two bits S4 and S3 of the sum S are outputted as signals d1 and d0 which are a 2-bit 4-level requantized signal. The signals d1 and d0 correspond to the signal D (Dr), FIG. 39. Among the sum S, lower three bits S2, S1 and S0 are representative of an error involved in the requantization and temporarily stored in the memory 32. The arithmetic unit 33 weighs the errors of pixels surrounding the pixel of interest in matching relation to the positions of the pixels, sums the weighted errors, and then produces a mean value of the weighted values. A pixel matrix representing the weighting coefficients associated with the pixel positions will be referred to as a weight matrix. In this embodiment, the weight matrix shown in FIG. 6 is used. In FIG. 6, the block indicating by hatching is the pixel of interest, i.e., the current signal C (c0–c4; D22c). As shown in FIG. 6, a particular weight is assigned to each pixel surrounding the pixel of interest and having been requantized, on the basis of the distance from the pixel of interest. As shown in FIG. 7, assume that error data written to the error memory 32 in association with the pixels shown in FIG. 6 are E1–E4. Then, the error data e particular to the pixel of interest is expressed as:

$$e = (1 \cdot E1 + 3 \cdot E2 + 1 \cdot E3 + 3 \cdot E4)/8$$

Upper three bits of the result of calculation are outputted as e2, e1 and e0 and connected to lower three bits (B2, B1 and B0) of the input terminal B of the adder 31. In FIGS. 6 and 7, x and y indicate respectively the main scanning direction and the subscanning direction in the printer 4.

The error memory 32 has a 1-line buffer memory for temporarily storing the errors (E1, E2 and E3) of a line immediately preceding the pixel of interest, and a shift register for temporarily storing the error (e.g. E4) of the pixel located on the same line as the pixel of interest and immediately preceding the latter. The operation of the requantization 3 shown in FIG. 5 may be summarized as follows.

1) Correcting c(D22c) on the basis of the errors of surrounding pixels by using $$\begin{aligned} S &= A + B \\ &= c + e \\ &= c + (1 \cdot E1 + 3 \cdot E2 + 1 \cdot E3 + 3 \cdot E4)/8; \end{aligned}$$

2) Extracting upper two bits of the sum S to requantize them to four levels; and 3) Temporarily storing lower three bits of the sum S in the memory 32 as an error particular to the pixel of interest, the error being used for correcting surrounding pixels later.

As stated above, the 17-level to 14-level requantization is effected while preserving the tonality of the signal C (D22c).

The printer modulates four kinds of pulse widths in association with the 2-bit 4-level image data d (D22d) and thereby records tones in four levels per pixel.

Figure 42:
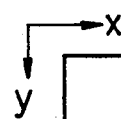
FIGS. 42 and 43 each shows a particular bidimensional distribution of weighting coefficients which a bilevel-to-multilevel conversion shown in FIG. 39 may use.
Figure 43:
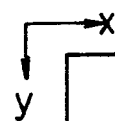

The above description has concentrated on the processing of bilevel red image data Ar. The bilevel green and blue data Ag and Ab are processed in the same manner as the red image data Ar. For example, the bilevel-to-multilevel conversion of green g uses weighting coefficients shown in FIG. 42 to convert the bilevel data to 10-level data while the conversion of blue b uses weighting coefficients shown in FIG. 43 to convert the bilevel data to 8-level data.

It should be noted that the bilevel-to-multilevel conversion may be implemented with means other than the smoothing filter, and that the size and coefficients of the smoothing filter are open to choice. The requantization may use a method other than the error scattering method, and the circuitry shown in FIG. 5 adapted for the error scattering method may be modified, as desired. The bilevel-to-multilevel conversion is not limited to bilevel-to-17-level conversion while the requantization is practicable with any desired number of levels other than four. In addition, the printer is not limited to a laser printer and may be replaced with an ink jet printer, thermal printer, etc.

The seventh embodiment described above achieves various advantages, as enumerated below.

(1) Not only 8-color recording but also multicolor recording are achievable in response to bilevel image data of different colors.

(2) Especially, when the input image data is bilevel data of the kind preserving color information (color separation values), desirable multicolor recording is attainable.

(3) Colors smoothly change.

(4) Concerning the advantage (3), when different images are combined, for example, the joints thereof appear natural to eye.

(5) High resolution is insured regarding the reproduction of colors and smooth edges.

(6) A particular number of tones, resolution, gamma characteristic and other factors may be assigned to each color to correct the color-by-color recording characteristic of the printer or to change the value of a recording color by color.

Specifically, the advantages (1), (2) and (6) are attainable since the bilevel data of different colors are each converted to multilevel data, requantized to N-level data, and then printed out by the printer in N levels. The advantages (1)–(4) and (6) stem from the fact that the bilevel-to-multilevel conversion is effected by smoothing means. The conversion to multilevel data is effected little by the kind of binarizing system. The advantages (1), (2), (5) and (6) are achieved since use is made of an error scattering method in executing the requantization to N-level data. Further, the advantages (1)–(6) are derived from the fact that the error scattering method is used to requantize data to N levels.

Figure 40:
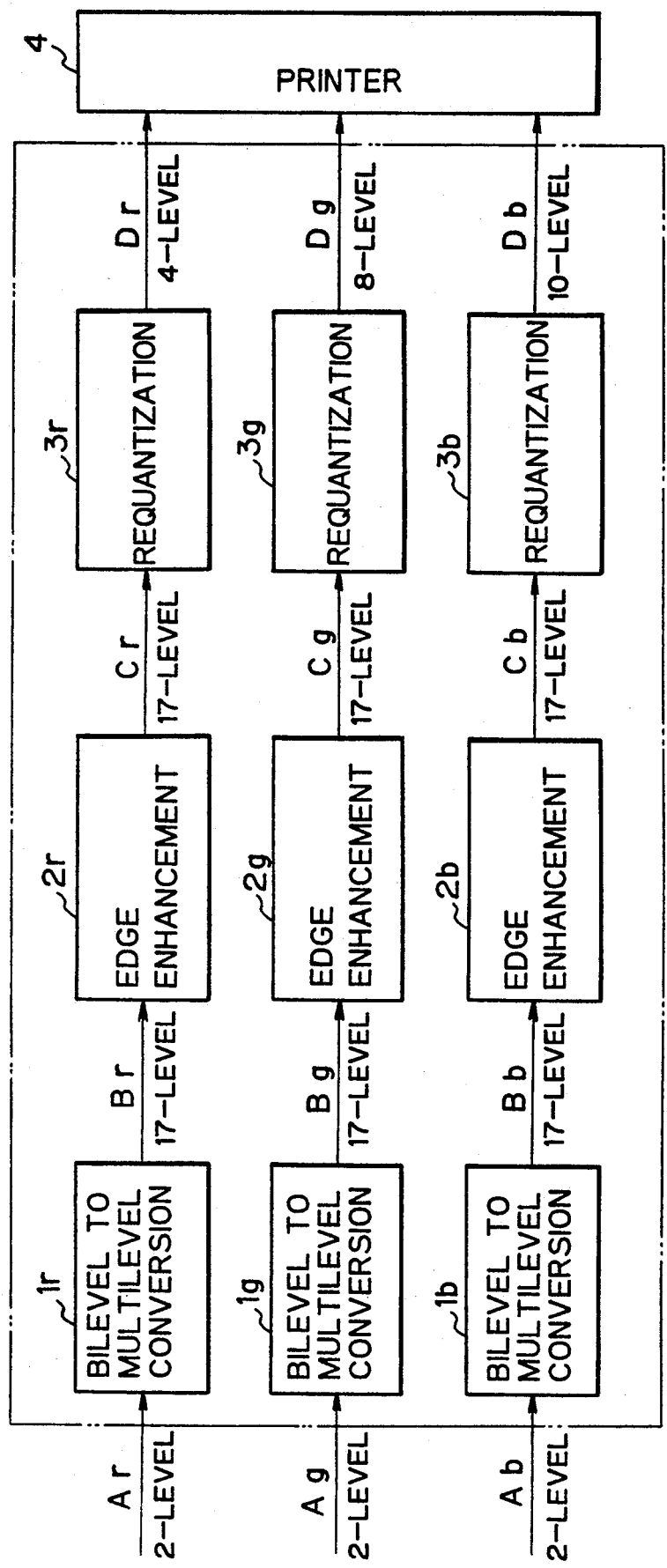

Referring to FIG. 40, the eighth embodiment of the present invention is shown. In the figure, there are shown red, green and blue signals Ar, Ag and Ab (or A collectively) representative of bilevel color data produced by color separation, multilevel image data Br, Bg and Bb (or B collectively), image data Cr, Cg and Cb (or C collectively) produced from the signals B by edge enhancement, and image data Dr, Dg and Db (or D collectively). In the illustrative embodiment, all the signals Br, Bg and Bb have seventeen levels while the signals Dr, Dg and Db are requantized to four levels, eight levels and six levels, respectively. The circuit is made up of bilevel-to-multilevel conversions 1r, 1g and 1b (or collectively) each converting bilevel image data of particular color to multi-level data by a bidimensional filter, edge enhancements 2r, 2g and 2b (or 2 collectively), requantizations 3r, 3g and 3b (or 3 collectively) requantizing respectively the multilevel data of red r, green g and blue b to four levels, eight levels, and six levels, and a PMW type laser beam printer 4 capable of recording tones in four levels per pixel for each color. The bilevel-to-multilevel conversions 1, edge enhancements 2 and requantizations 3 will hereinafter be referred to as image processing collectively.

The bilevel-to-multilevel conversions 1 and edge enhancements 2 of this embodiment are identical in construction with the conversions 1 and enhancements 2 of the seventh embodiment. While the requantization 3r, like the requantization 3r of the seventh embodiment, produces 4-level data, the requantizations 3g and 3b produce 8-level data and 6-level data, respectively.

The eighth embodiment described above achieves the following advantages.

(1) Not only 8-color recording but also multicolor recording are achievable in response to bilevel image data of different colors.

(2) Especially, when the input image data is bilevel data of the kind preserving color information (color separation values), desirable multicolor recording is attainable.

(3) Colors smoothly change.

(4) Concerning the advantage (3), when different images are combined, for example, the joints thereof appear natural to eye.

(5) High resolution is insured regarding the reproduction of colors and smooth edges.

(6) A particular number of tones, resolution, gamma characteristic and other factors may be assigned to each color to correct the color-by-color recording characteristic of the printer or to change the value of a recording color by color.

Specifically, the advantages (1), (2) and (6) are attainable since the bilevel data of different colors are each converted to multilevel data, requantized to N-level data, and then printed out by the printer in N levels. The advantages (1)–(4) and (6) stem from the fact that the bilevel-to-multilevel conversion is effected by smoothing means. The conversion to multilevel data is effected little by the kind of binarizing system. The advantages (1), (2), (5) and (6) are achieved since use is made of the error scattering method in executing the requantization to N-level data. Further, the advantages (1)–(6) are derived from the fact that the error scattering method is used to requantize data to N levels.

Figure 41:
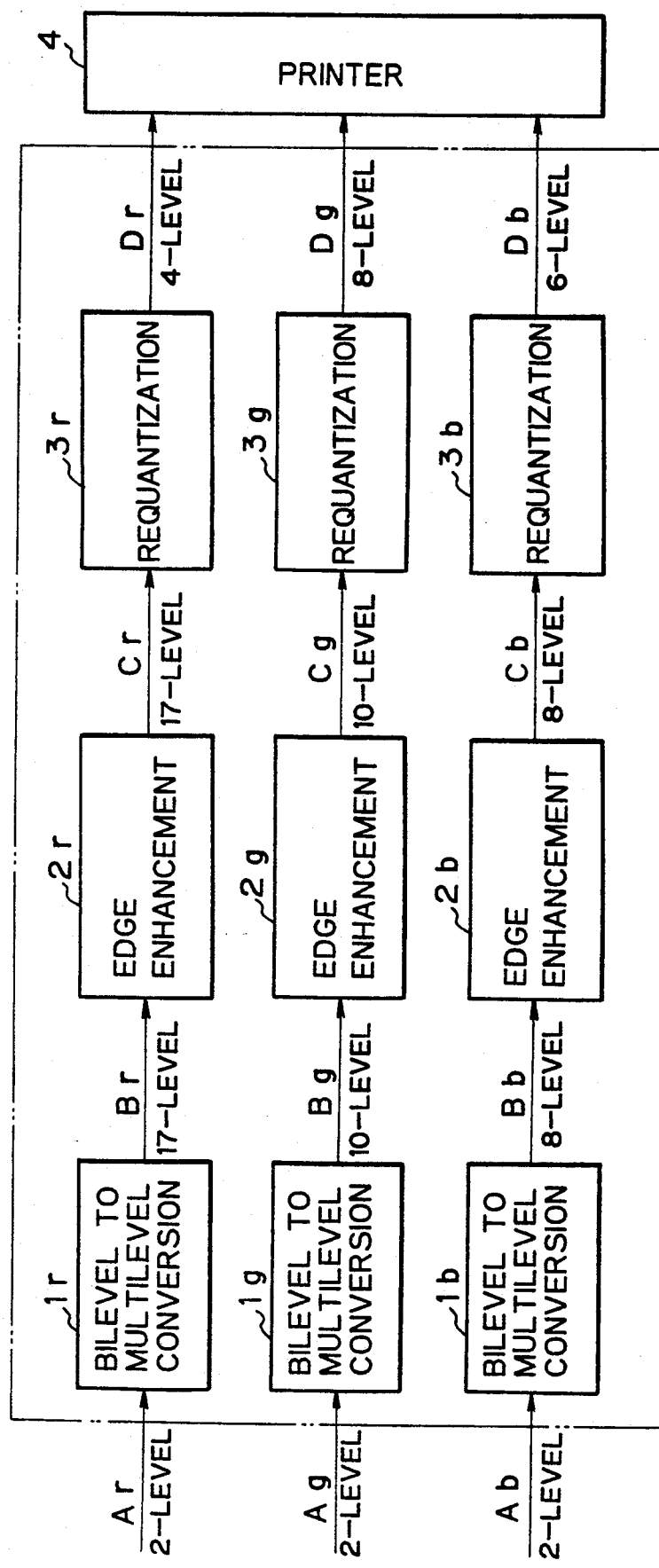

FIG. 41 shows a ninth embodiment of the present invention. There are shown in the figures red, green and blue signals Ar, Ag and Ab (or A collectively) representative of bilevel color data produced by color separation, multilevel image data Br, Bg and Bb (or B collectively), image data Cr, Cg and Cb (or C collectively) produced from the signals B by edge enhancement, and image data Dr, Dg and Db (or D collectively). In the illustrative embodiment, the signals Br, Bg and Bb have seventeen levels, ten levels, and eight levels, respectively, as in the seventh embodiment. The signals Dr, Dg and Db are representative of image data requantized to four levels, eight levels, and six levels, respectively, as in the eight embodiment. The circuit is made up of bilevel-to-multilevel conversions 1r, 1g and 1b (or 1 collectively) each converting bilevel image data of particular color to multi-level data by a bidimensional filter, edge enhancements 2r, 2g and 2b (or 2 collectively), requantizations 3r, 3g and 3b (or 3 collectively) requantizing red data r, green data g and blue data b to four levels, eight levels and six levels, respectively, and a PMW type laser beam printer 4 capable of recording tones in four levels per pixel for each color. The bilevel-to-multilevel conversions 1, edge enhancements 2 and requantizations 3 will hereinafter be referred to as image processing collectively.

The bilevel-to-multilevel conversions 1 and edge enhancements of this embodiment are identical with the bilevel-to-multilevel conversions and edge enhancements of the seventh embodiment. The requantizations 3 are the same as the requantizations 3 of the eighth embodiment, i.e., the requantization 3r outputs 4-level data while the requantizations 3g and 3b output 8-level data and 6-level data, respectively.

The ninth embodiment described above also achieves various advantages, as enumerated below.

(1) Not only 8-color recording but also multicolor recording are achievable in response to bilevel image data of different colors.

(2) Especially, when the input image data is bilevel data of the kind preserving color information (color separation values), desirable multicolor recording is attainable.

(3) Colors smoothly change.

(4) Concerning the advantage (3), when different images are combined, for example, the joints thereof appear natural to eye.

(5) High resolution is insured regarding the reproduction of colors and smooth edges.

(6) A particular number of tones, resolution, gamma characteristic and other factors may be assigned to each color to correct the color-by-color recording characteristic of the printer or to change the value of a recording color by color.

(7) Multicolor recording can be executed by a simple construction.

Specifically, the advantages (1), (2) and (6) are attainable since the bilevel data of different colors are each converted to first levels, requantized to second levels, and then printed out by the printer in multiple levels. The advantages (1)–(4) and (6) stem from the fact that the bilevel-to-multilevel conversion is effected by smoothing means. The conversion to multilevel data is effected little by the kind of binarizing system. The advantages (1), (2) and (5) are achieved since use is made of the error scattering method in executing the requantization to N-level data. The advantages (1), (2) and (6) are derived from the fact that the bilevel data of each color is converted to first multiple levels, requantized to second levels, and then printed out in multiple levels. Since the smoothing means converts each color to first multilevels, the advantages (1)–(4) are attainable. The conversion to multilevel data is not susceptible to the kind of binarizing system used. Since each color is requantized to second multilevels by the error scattering method, the advantages (1), (2) and (5) are achieved. Since each color is converted to first multilevels by smoothing means and then requantized to second multilevels by the error scattering method, the advantages (1)–(6) are achieved. Since binary data of each color is converted to multilevels, then requantized to multilevels and then rendered in tones by the printer, the advantages (1), (2) and (7) are attained. Smoothing means is used to transform each color to multilevels, offering the advantages (1)–(4) and (7). The conversion to multilevels is effected little by the kind of a binarizing system used. Since each color is requantized to multiple levels by the error scattering method, the advantages (1), (2), (5) and (7) are achieved. Further, the advantages (1)–(5) and (7) are derived from the fact that each color is converted to multiple levels by smoothing means and then requantized to multiple levels by the error scattering method.

Figure 44:
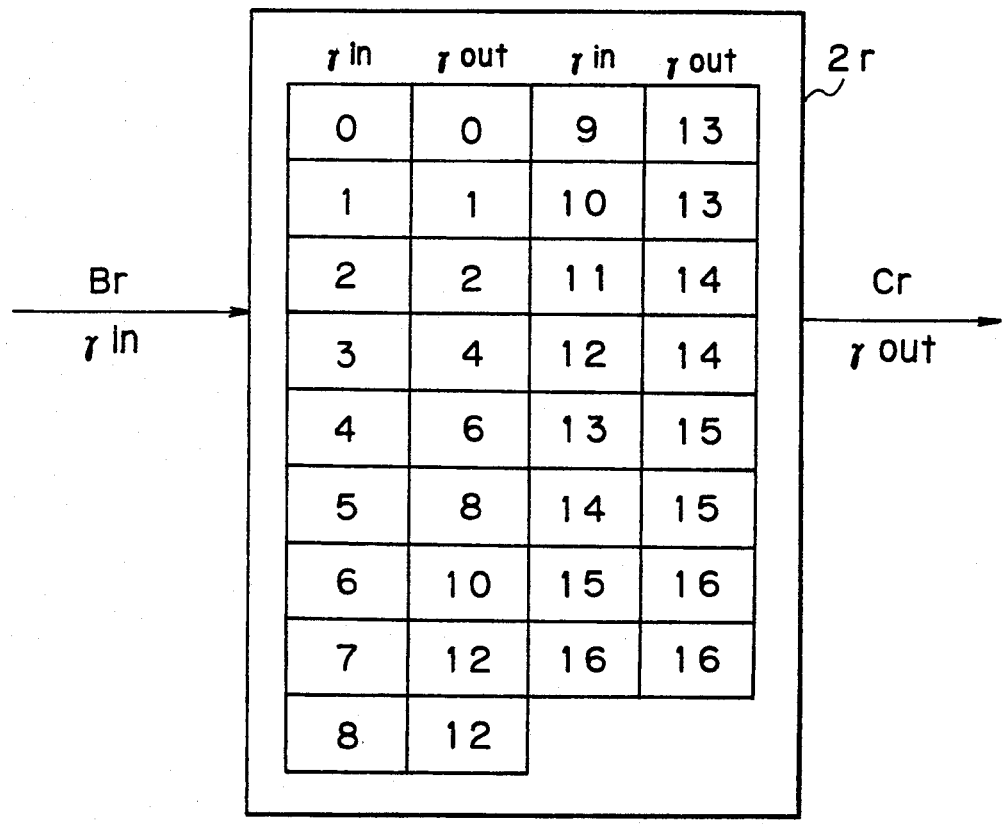
FIGS. 44 and 45 show respectively specific gamma correction tables assigned to gamma corrections included in a tenth and an eleventh embodiment of the present invention.

A tenth embodiment which will be described is implemented with the construction shown in FIG. 39, except for gamma corrections 2r, 2g and 2b (or 2 collectively). FIG. 44 shows the principle of the gamma correction 2r, for example. This embodiment is the same as the seventh embodiment except for the gamma corrections 2. As shown, the gamma correction 2r outputs, in response to a signal B (Br), a particular value included in a gamma correction table as a signal C(Cr). Specifically, the gamma correction table shown in FIG. 44 is such that a portion where the level of red data r is low is enhanced. The other gamma corrections 2g and 2b each has a similar gamma correction table whose content depends on the color.

The illustrative embodiment may be modified or changed in any desired manner. For example, the bilevel-to-multilevel conversion means is not limited to a smoothing filter, and the size and coefficients of a smoothing filter are open to choice. The gamma correction means may be implemented by a system other than the correction table type system, and the content of the correction table may be changed. The error scattering method for the requantization means is not limitative, and the circuit of FIG. 5 adapted to the error scattering method may be modified in a suitable manner. The bilevel data may be converted to any multilevel data other than 17-level data, and the requantization is not limited to four levels. Further, the laser beam printer may be replaced with an ink jet printer, thermal printer or similar printer.

The tenth embodiment described above achieves the following advantages.

(1) Not only 8-color recording but also multicolor recording are achievable in response to bilevel image data of different colors.

(2) Especially, when the input image data is bilevel data of the kind preserving color information (color separation values), desirable multicolor recording is attainable.

(3) Colors smoothly change.

(4) Concerning the advantage (3), when different images are combined, for example, the joints thereof appear natural to eye.

(5) High resolution is insured regarding the reproduction of colors and smooth edges.

(6) A particular number of tones, resolution, gamma characteristic and other factors may be assigned to each color to correct the color-by-color recording characteristic of the printer or to change the value of a recording color by color.

Specifically, the advantages (1), (2) and (6) are attainable since the binary data of different colors are each converted to multilevel data, requantized to N-level data, and then printed out by the printer in N levels. The advantages (1)-(4) and (6) stem from the fact that the bilevel-to-multilevel conversion is effected by smoothing means. The conversion to multilevel data is effected little by the kind of binarizing system. The advantages (1), (2), (5) and (6) are achieved since use is made of the error scattering method in executing the requantization to N-level data. Further, the advantages (1)-(6) are derived from the fact that the error scattering method is used to quantize data to N levels.

Figure 45:
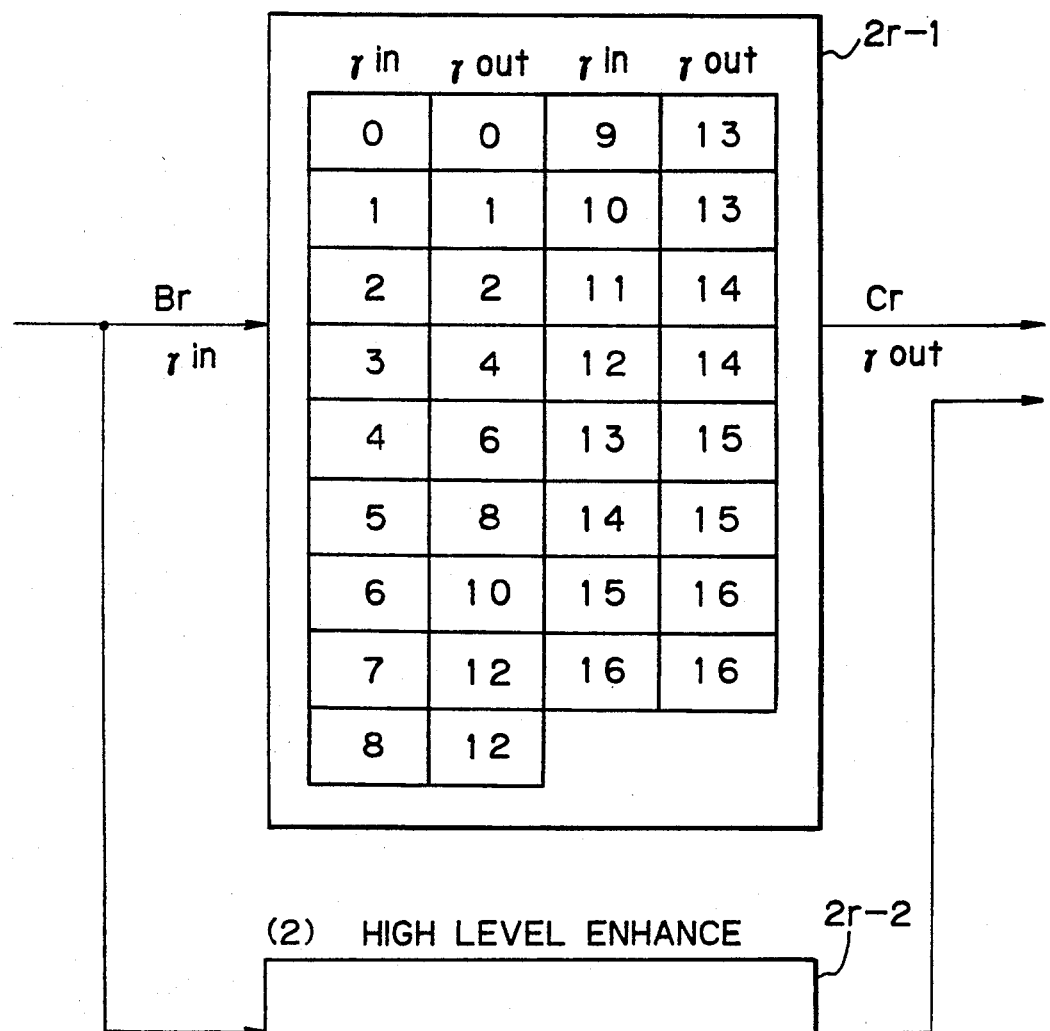

An eleventh embodiment which will be described is also constructed as shown in FIG. 39, except for gamma corrections 2r, 2g and 2b (or 2 collectively). FIG. 45 shows a specific gamma correction table assigned to the gamma correction 2r, for example. The eleventh embodiment is similar to the seventh embodiment except for the gamma corrections 2. The gamma correction 2 (2r) outputs, in response to a signal B (Br), a particular value of the gamma correction table as a signal C (Cr). Specifically, the gamma correction 2 (2r) has a gamma correction table 2r-1 for enhancing low levels, a gamma correction table 2r-2 for enhancing high levels, and a circuit, not shown, for selecting either one of the tables 2r-1 and 2r-2 in response to a command signal. The tables 2r-1 and 2r-2 enhance respectively portions where the level of red data γ is low and portions where it is high. The other gamma corrections 2 (2g and 2b) are each provided with two gamma correction tables and constructed to select one of them as designated by a command signal.

The illustrative embodiment may be modified or changed in any desired manner. For example, the bilevel-to-multilevel conversion means is not limited to a smoothing filter, and the size and coefficients of a smoothing filter are open to choice. The gamma correction means may be implemented by a system other than the correction table type system, and the content of the correction table may be changed. The gamma correction selecting section may use any suitable system other than the system selecting a particular correction table, and the contents of the system may be changed. The error scattering method for the requantization means is not limitative, and the circuit of FIG. 5 adapted to the error scattering method may be modified in a suitable manner. The bilevel data may be converted to any multilevel data other than 17-level data, and the requantization is not limited to four levels. Further, the laser beam printer may be replaced with an ink jet printer, thermal printer or similar printer.

The eleventh embodiment achieves the following advantages.

(1) Not only 8-color recording but also multicolor recording are achievable in response to bilevel image data of different colors.

(2) Especially, when the input image data is bilevel data of the kind preserving color information (color separation values), desirable multicolor recording is attainable.

(3) Colors smoothly change.

(4) Concerning the advantage (3), when different images are combined, for example, the joints thereof appear natural to eye.

(5) High resolution is insured regarding the reproduction of colors and smooth edges.

(6) A particular number of tones, resolution, gamma characteristic and other factors may be assigned to each color to correct the color-by-color recording characteristic of the printer or to change the value of a recording color by color.

Specifically, the advantages (1), (2) and (6) are attainable since the binary data of different colors are each converted to multilevel data, requantized to N-level data, and then printed out by the printer in N levels. The advantages (1)-(4) and (6) stem from the fact that the bilevel-to-multilevel conversion is effected by smoothing means. The conversion to multilevel data is effected little by the kind of binarizing system. The advantages (1), (2), (5) and (6) are achieved since use is made of the error scattering method in executing the requantization to N-level data. Further, the advantages (1)-(6) are derived from the fact that the error scattering method is used to requantize data to N levels.

Various modifications will become possible for those skilled in the art after receiving the teachings of the present disclosure without departing from the scope thereof.

What is claimed is:

1. An image recorder comprising:
bilevel-to-multilevel converting means for converting input bilevel image data to M-level data (M being equal to or greater than 3), said bilevel-to-multilevel converting means comprising a filter having weighting coefficients;

requantizing means for converting multilevel data to N-level data (N being equal to or greater than 2 and smaller than M); and recording means capable of recordig a single pixel in any one of N levels;

input image data being converted to M-level data by said bilevel-to-multilevel converting means, then converted to N-level data by said requantizing means, and then recorded by said recording means.

2. An image recorder comprising:

bilevel-to-multilevel converting means for converting input blevel image data to M-level data (M being equal to or greater than 3), said bilevel-to-multilevel converting means comprising a filter having weighting coefficients and executing bilevel-to-multilevel conversion on the basis of a pattern of input binary image data;

requantizing means for converting multilevel data to N-level data (N being equal to or greater than 2 and smaller than M); and recording means capable of recording a single pixel in any one of N levels;

input bilevel image data being converted to M-level data, then subjected to image processing, then converted to N-level data by said requantizing means, and then recorded said recording means.

3. An image recoder comprising:

a plurality of bilevel-to-multilevel converting means each being operable by a particular system for converting input bilevel image data to M-level data (M being equal to or greater than 3), said bilevel-to-multilevel converting means each comprising a filter having weighting coefficients;

requantizing means for converting multilevel data to N-level data (N being equal to or greater than 2 and smaller than M); and recording means capable of recording a single pixel in any one of N levels;

input bilevel image data being converted to M-level data by said bilevel-to-multilevel converting means, then subjected to image processing, requantized by said requantizing means to N-level data, and then recorded by said recording means.

4. An image recorder comprising:

bilevel-to-multilevel converting means for converting input bilevel image data M-level data (M being equal to or greater than 3), said bilevel-to-multilevel converting means comprising a filter and a plurality of bilevel-to-multilevel conversion patterns;

requantizing means for converting multilevel data to N-level data (N being equal to or greater than 2 and smaller than M); and recording means capable of recording a single pixel in any one of N levels;

input bilevel image data being converted to M-level data by said bilevel-to-multilevel converting means, then subjected to image processing, then converted to N-level data, and then recorded by said recording means.

5. An image recorder comprising:

bilevel-to-multilevel converting means including a filter having weighting coefficients for converting input bilevel image data to M-level data (M being equal to or greater than 3);

requantizing means for converting multilevel data to N-level data (N being equal to or greater than 2 and smaller than M); and recording means capable of recording a single pixel in any one of N levels;

input bilevel image data being converted to M-level data, then subjected to image processing, then converted to N-level data by said requantizing means, and then recorded by said recording means;

said recorder changing a bilevel-to-multilevel conversion system depending on the kind of input bilevel image data.

6. An image recorder comprising:

bilevel-to-multilevel converting means for converting input bilevel data to M-level data (M being equal to or greater than 3), said bilevel-to-multilevel converting means comprising a filter having weighting coefficients;

requantizing means for converting multilevel data to N-level data (N being equal to or greater than 2 and smaller than M);

recording means capable of recording a single pixel in any one of N levels; and image processing means for executing at least one of edge enhancement, magnification change and gamma correction with said M-level data;

input bilevel image being converted to M-level data by said bilevel-to-multilevel converting means, then subjected to at least one of edge enhancement, magnification change and gamma correction, then converted to N-level data by said requantizing means, an then recorded by said recording means.

7. An image recorder comprising:

a plurality of bilevel-to-multilevel converting means each being assigned to respective one of a plurality of separated colors for converting bilevel image data of associated color to M-level data of said color (M being equal to or greater than 3);

a plurality of requantizing means each being associated with said plurality of bilevel-to-multilevel converting means for converting said M-level data of particular color to N-level data (N being equal to or greater than 2 and smaller than M); and a printer capable of recording data in N levels per pixel in each color;

bilevel image data of said plurality of colors each being converted to M-level data by a filter incorporated in associated one of said bilevel-to-multilevel converting means and having weighting coefficients, then converted to N-level data by associated one of said requantizing means, and then recorded by said printer.

8. An image recorder comprising:

a plurality of bilevel-to-multilevel converting means each being assigned to respective one of a plurality of separated colors for converting bilevel image data of associated color to M-level data (M being equal to or greater than 3);

a plurality of gamma correcting means each being associated with respective one of said plurality of bilevel-to-multilevel converting means for executing gamma correction with said M-level data;

a plurality of quantizing means each being associated with said plurality of gamma correcting means for converting the gamma-corrected data of associated color to N-level data (N being equal to or greater than 2 and smaller than M); and a printer capable of recording data in N levels per pixel in each color;

bilevel image data of said plurality of colors each being converted to M-level data by a filter incorporated in associated one of said bilevel-to-multilevel converting means and having weighting coefficients, then subjected to gamma correction color by color, then converted to N-level data by associated one of said requantizing means, and then recorded by said printer.

9. An image recorder comprising:

a plurality of bilevel-to-multilevel converting means each being assigned to respective one of a plurality of separated colors for converting bilevel image data of associated color to M-level data (M being equal to or greater than 3);

a plurality of gamma correcting means each being associated with respective one of said plurality of bilevel-to-multilevel converting means for executing gamma correction with said M-level data;

means for selecting gamma correction;

a plurality of quantizing means each being associated with said plurality of gamma correcting means for converting the gamma-corrected data of associated color to N-level data (N being equal to or greater than 2 and smaller than M); and a printer capable of recording data in N levels per pixel in each color;

bilevel image data of said plurality of colors each being converted to M-level data by a filter incorporated in associated one of said bilevel-to-multilevel converting means and having weighting coefficients, then subjected to gamma correction selected color by color, then converted to N-level data by associated one of said requantizing means, and then recorded by said printer.

* * * * *